United States Patent [19]

Nakano

[11] 4,095,091
[45] June 13, 1978

[54] METHOD FOR CONTROLLING INFORMATION RECOGNIZING OPERATION

[75] Inventor: Yoshiaki Nakano, Gifu, Japan
[73] Assignee: Nippondenso Co., Ltd., Kariya, Japan
[21] Appl. No.: 786,625
[22] Filed: Apr. 11, 1977

[30] Foreign Application Priority Data

Apr. 21, 1976 Japan ............................ 51-45995

[51] Int. Cl.² .............................................. G06K 7/10
[52] U.S. Cl. .................................................... 235/462
[58] Field of Search ............................... 340/146.3 K; 235/61.11 E

[56] References Cited

U.S. PATENT DOCUMENTS

| | | | |
|---|---|---|---|
| 3,086,121 | 4/1963 | Cockrell | 235/454 |
| 3,731,067 | 5/1973 | Arevizn et al. | 340/146.3 K |
| 3,794,812 | 2/1974 | Bryant | 235/61.11 E |
| 4,025,442 | 5/1977 | Cass | 235/61.11 E |

*Primary Examiner*—Vincent P. Canney
*Attorney, Agent, or Firm*—Cushman, Darby & Cushman

[57] ABSTRACT

A method for controlling information recognizing operation in which detecting an object, scanning the information recorded on the object and recognizing the scanned information are accomplished sequentially during the transfer of the object. While the object recorded with a code information thereon is transferred to face a scanning device, a detecting device detects existence of the object first and then the scanning device repeats to scan the code of the object. A data control device, rendered operative during object detecting operation of the detecting device, generates a timer signal having a constant time period within which a data processing device is allowed to recognize the input data applied from the scanning device. Setting the constant time period of the timer signal to be nearly equal to or shorter than the time period in which the object faces the scanning device, information recognizing operation is attained correctly per each object even when a plurality of objects are transferred with the tail of one object contacting with the head of the other object.

3 Claims, 12 Drawing Figures

METHOD FOR CONTROLLING INFORMATION RECOGNIZING OPERATION

BACKGROUND OF THE INVENTION

The present invention relates to a method for controlling information recognizing operation of an information recognition system, wherein information recognizing operation per one information is limited to a predetermined constant time period.

It has been demanded in recent years that classifying various objects is automated in manufacturing factories, for example, by scanning the information recorded on the objects to be automatically recognized during the transfer thereof. To attain the automatic information scanning and recognizing operations, an object detecting device and an information scanning device are provided at respective predetermined positions near an automated belt conveyer so that the former detects the existence of the object carried by the conveyer and the latter scans the information attached on the object in response to the detection of that object. According to this method, however, accurate information recognizing operation cannot be attained, when a plurality of objects are carried successively with the tail of one object contacting with the head of the other object. In case of this successive movement of the objects, only the existence of the preceding object can be detected resulting in that the information of the preceding object is scanned and recognized whereas the information of the following object is not.

SUMMARY OF THE INVENTION

It is a primary object of this invention to limit the time period of information recognizing operation to a constant time period so that the information of preceding and following objects are recognized during the respective preceding and following constant time periods.

It is a further object of this invention to limit the time period of information recognizing operation by the use of a timer signal having a constant time period.

DESCRIPTION OF THE PREFERRED EMBODIMENT

Figure 1:
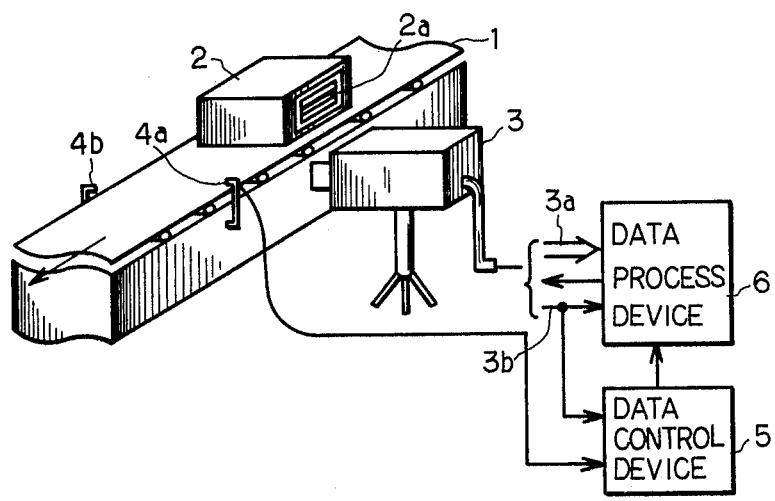
FIG. 1 is a schematic view showing an information recognition system for attaining the method according to this invention.

Referring first to FIG. 1 in which an information recognition system according to this invention is schematically illustrated, reference numeral 1 denotes a belt conveyor which is moved at a constant speed to transfer an object 2 such as a product package. The object 2 is attached with label 2a on the side surface thereof. Information representing the content or the number of the object 2 is coded into a bar code and printed on the label 2a. Numeral 3 denotes an information scanning device which is stationed beside the conveyer 1 to face the bar code recorded on the label 2a. The information scanning device 3 is so designed in a manner that it repeats scanning the bar code on the object 2 and generates both a parallel code data signal 3a indicative of the scanned bar code and a data enabling signal 3b only when two successive scanning data derived from the repetitive scannings are identical. Numerals 4a and 4b denote a light receiver and a light transmitter which are positioned beside the conveyer 1 to face each other. The light receiver 4a and the light transmitter 4b constitute an object detecting device which generates a detection signal during the time when the light transmitted from the transmitter 4b toward the receiver 4a is cut off by the object 2. Numeral 5 denotes a data control device which is connected to the information scanning device 3 and the light receiver 4a for receiving the data enabling signal 3b and the detection signal. The data control device 5, as hereinunder described in detail, generates a data control pulse which is derived by passing only the first pulse of the data enabling signal. Numeral 6 denotes a data processing device incorporating a computer which is programmed to process the parallel code data signal 3a in response to the data control pulse generated by the data control device 5.

Figure 2:
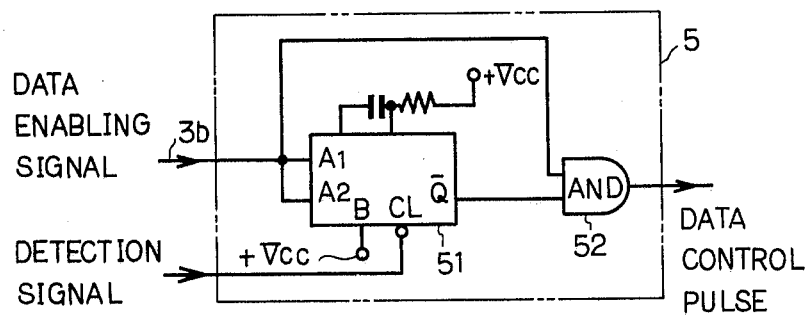
FIG. 2 is an electric wiring diagram showing the first embodiment of a part of the system of FIG. 1.

The data control device 5 is designed as shown in FIG. 2. In this FIG., numerals 51 and 52 denote an integrated circuit monostable multivibrator and an AND gate, respectively. The monostable multivibrator 51 is connected to receive the data enabling signal 3b and the detection signal and generates a low level timer signal at the $\overline{Q}$ output terminal thereof in synchronism with the trailing edge of the first pulse of the data enabling signal 3b. The timer signal has a constant time period T which is determined by the RC time constant of a resistor and a capacitor connected to the multivibrator 51. The AND gate 52 is connected to receive the data enabling signal 3b and the timer signal.

Figure 3:
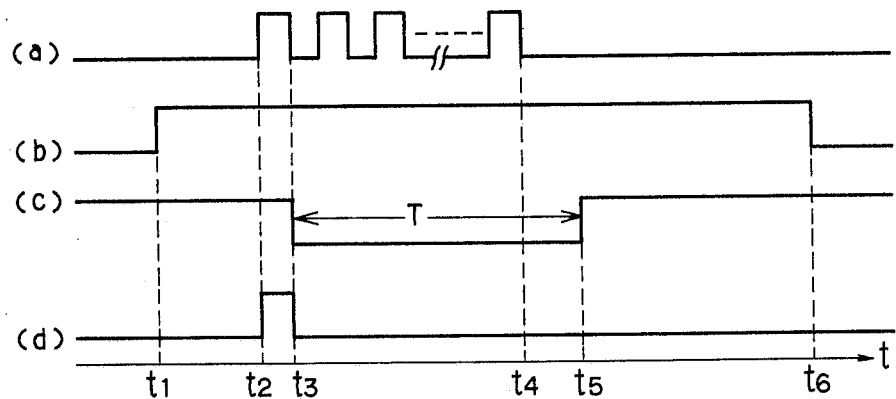
FIG. 3 is a timing chart showing signal waveforms (a) through (d) which are available for explaining the operation of the first embodiment of FIG. 2.

Various signals appearing in and around the data control device 5 shown in FIG. 2 are shown in FIG. 3, in which waveform (a) shows the data enabling signal 3b applied from the information scanning device 3, (b) the detection signal applied from the light receiver 4a, (c) the timer signal generated by the multivibrator 51 and (d) the data control pulse generated from the AND gate 52.

The operation of the first embodiment is described next with particular reference to FIGS. 2 and 3. It is assumed that the object 2 carried by the conveyer 1 has reached the position between the light transmitter 4b and the light receiver 4a at the time $t_1$. On this occasion, the light from the transmitter 4b is cutt off by the object 2 and the receiver 4a starts to generate the detection signal which is high level as shown in (b) of FIG. 3. After the further transfer of the object 2, the bar code recorded on the label 2a is repeatedly scanned by the information scanning device 3. When two successive scanning data are detected to be identical at the time $t_2$ for the first time, both the parallel code data signal 3a corresponding to the scanned bar code and a high level indicative of the identity between the successive scanning data are generated. Since the bar code scanning is repeated while the label 2a faces the scanning device 3, the high level pulse is generated as shown in (a) of FIG. 3 each time when the identity between the successive scanning data is detected. A train of pulses of FIG. 3 (a) constitute the data enabling signal 3b. At the time $t_2$ when the identity is detected for the first time, the multivibrator 51 does not generate the low level timer signal at the $\overline{Q}$ output terminal. The first high level pulse of the data enabling signal 3b is passed through the AND gate 52. The monostable multivibrator 51 is triggered by the trailing edge of the first pulse of the enabling signal 3b to generate the low level timer signal shown in (c) of FIG. 3 and the AND gate 52 cuts off the pulses applied after the time $t_3$. Cutting off the pulses of the enabling signal 3b is kept even at the time $t_4$ when the enabling signal 3b disappears, because the constant time period T of the timer signal is so determined as to terminate at the time $t_5$ after the time $t_4$. It would be easily understood that the time period T must be nearly equal to or shorter than a time period in which the bar code on the label 2a keeps facing the scanning device 3. The AND gate 52, thus cutting off the data enabling signal 3b during the time period T, passes only the first pulse of the enabling signal 3b to generate the data control pulse shown in (d) of FIG. 3. At the time $t_6$ when the light receiver 4a receives the light from the light transmitter 4b again due to the passage of the object 2, the detection signal shown in (b) of FIG. 3 is reversed to the low level. The data control pulse generated by the data control device 5 during the period $t_2 - t_3$ is applied to the data processing device 6, and the recognizing device 6 in turn reads in and recognizes the parallel code data signal 3a applied during the period $t_2 - t_3$ as the correct data. The parallel code data signal 3a which has been thus read in and recognized is used for the automation of classifying the object 2, for example.

The information scanning and recognizing operations described with reference to the period $t_1 - t_6$ is repeated each time when the existence of the object 2 is detected. When the objects 2 are transferred successively on the conveyer 1 particularly with the tail of one object contacting with the head of the other object, the detection signal shown in (b) of FIG. 3 is kept generated after the time $t_6$ and the data enabling signal 3b corresponding to the following object is generated after the time $t_6$. Provided that the constant time period T of the timer signal shown in (c) of FIG. 3 is set shorter than the period in which the object faces the scanning device 3, the data control device 5 is enabled to generate the data control pulse in response to which the parallel code data signal 3a corresponding to the following object is recognized by the data processing device 6.

Figure 4:
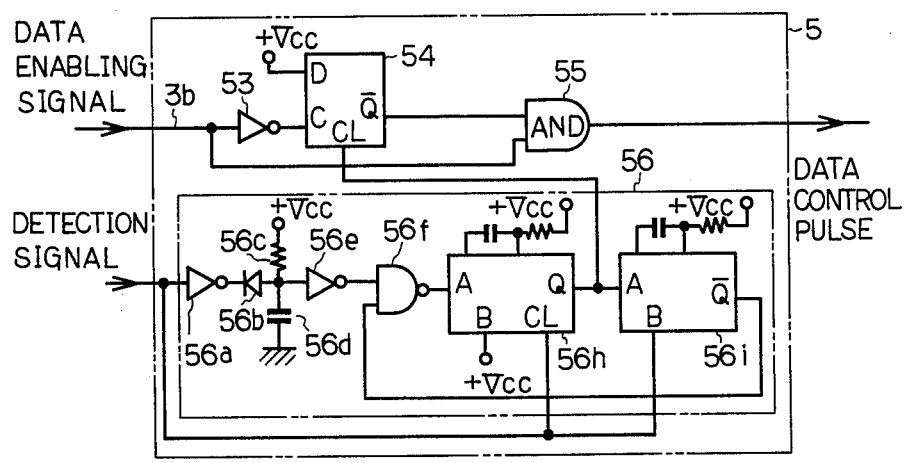
FIG. 4 is an electric wiring diagram showing the second embodiment of a part of the system of FIG. 1.
Figure 5:
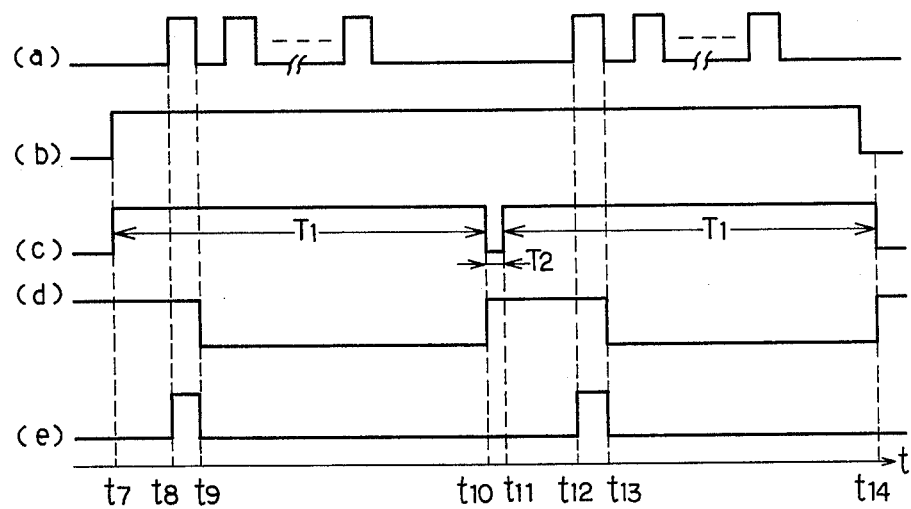
FIG. 5 is a timing chart showing signal waveforms (a) through (e) which are available for explaining the operation of the second embodiment of FIG. 4.

The second embodiment of the invention is described hereinunder with reference to FIGS. 4 and 5. In FIG. 4 which shows the other circuit construction of the data control circuit 5, numeral 53 denotes an inverter which inverts the signal level of the data enabling signal 3b, 54 a D flip-flop connected to the inverter 53, and 55 an AND gate connected to receive the data enabling signal 3b and the $\overline{Q}$ output signal of the flip-flop 54. A constant voltage $V_{cc}$ and the output signal of the inverter 53 are applied to the data input terminal D and the clock input terminal C of the flip-flop 54, respectively. Numeral 56 denotes a timer circuit which is so designed that it generates a high level timer signal having a constant time period in response to the leading edge of the detection signal. The timer circuit 56 comprises inverters 56a and 56e, diode 56b, a resistor 56c, a capacitor 56d, a NAND gate 56f, a first monostable multivibrator 56h and a second monostable multivibrator 56i. The diode 56b, the resistor 56c and the capacitor 56d, constituting a delay circuit, are connected between the inverters 56a and 56e to exclude the noise component from the output signal of the inverter 56a. The multivibrators 56h and 56i are triggered by the falling edges of signals applied to respective terminals A. The Q output terminal of the first multivibrator 5h is connected to the clear terminal CL of the flip-flop 54 so that the first timer signal having the constant period $T_1$ is applied from the former to the latter. The $\overline{Q}$ output terminal of the second multivibrator 56i is connected to the input terminal of the NAND gate 56f so that the second timer signal having the constant period $T_2$ is fed back from the former to the latter. Setting the time period $T_2$ of the second timer signal much shorter than that of the first timer signal and feeding back the former signal, the first multivibrator 56h is enabled to generate the first timer signal repeatedly.

Various signals appearing in and around the data control device 5 shown in FIG. 4 are shown in FIG. 5, in which waveform (a) shows the data enabling signal 3b applied from the information scanning device 3, (b) the detection signal applied from the light receiver 4a, (c) the first timer signal generated by the first multivibrator 56h, (d) the output signal generated by the D flip-flop 54 and (e) the data control generated by the AND gate 55.

The operation of the second embodiment shown in FIGS. 4 and 5 is described hereinunder with respect to the particular case, wherein two objects 2 are transferred contacting each other. At the time $t_7$ when the first object 2 reaches between the light transmitter 4b and the light receiver 4a, the detection signal is generated. This detection signal is kept generated as shown in (b) of FIG. 5 until when the second object 2 completes passing between the light transmitter 4b and the light receiver 4a. As the detection signal is applied to the NAND gate 56f through the inverters 56a and 56e, the output signal of the NAND gate 56f falls from high level to low level in synchronism with the leading edge of the detection signal. The multivibrator 56h, triggered at the time $t_7$, generates the first timer signal shown in (c) of FIG. 5. This first timer signal is kept generated until the time $t_{10}$ after the lapse of the first constant period $T_1$ in which the object 2 faces the scanning device 3. The second multivibrator 56i, triggered by the trailing edge of the first signal, then generates the low level second timer signal having the second constant time period $T_2$ from the time $t_{10}$ to $t_{11}$. As the second timer signal is fed back to the NAND gate 56f, the NAND gate 56f again triggers the first multivibrator 56h at the time $t_{11}$ so that the second timer signal is again generated from the time $t_{11}$ to the time $t_{14}$. It must be understood herein that the time $t_{14}$ is nearly equal to the time when the detection signal is terminated because the second time period $T_2$ is present very short. Receiving a train of first timer signals from the first multivibrator 56h, the D flip-flop 54 is kept operative during the time period $T_1$. The D flip-flop 54 keeps memorizing the input signal applied to the data terminal D during the operative condition thereof in response to the low level signal applied to the clock terminal C and clears up when the first timer signal is terminated. Assuming that the first pulse of the data enabling signal 3b is generated from the time $t_8$ to the time $t_9$ as shown in (a) of FIG. 5, the D flip-flop 54 generates a low level output signal at the $\overline{Q}$ terminal from the time $t_9$ to the time $t_{10}$ as shown in (d) of FIG. 5 due to the application of the constant voltage $V_{cc}$ to the data terminal D. The D flip-flop 54, after cleared up at the time $t_{10}$, generates the low level signal again from the time $t_{13}$ to the time $t_{14}$ as shown in (d) of FIG. 5, because the first pulse of the data enabling signal 3b is generated from the time $t_{12}$ to the time $t_{13}$. It would be easily understood that the data enabling signals 3b shown in (a) of FIG. 5 during the periods $t_7 - t_{10}$ and $t_{11} - t_{14}$ are generated while the bar codes of the preceding object and the following object are scanned respectively by the scanning device 3 of FIG. 1. As the data enabling signal 3b and the output signal of the D flip-flop 54 are applied to the AND gate 55, only the first pulse of the data enabling signal 3b is generated therefrom as the data control pulse. As shown in (e) of FIG. 5, the data control pulses are generated from the times $t_8$ and $t_{12}$ while the bar codes of the preceding and the following objects are scanned, respectively. The data control pulses, thus generated, are used in the same manner as in the first embodiment, whereby information recognizing operation is attained per each object even if the preceding and the following objects are transferred contacting with each other.

In the above embodiments, the detail description with respect to the information scanning device 3 and the data processing device 6 is not made because it makes the disclosure too lengthy and because it has been already made in the U.S. patent application Ser. No. 668,036 assigned to the same assignee as this application.

Although the information of the object is coded into a bar code and only the first pulse of the data enabling signal is used for information recognizing operation according to the above described embodiments, the information of the object may be represented by the other form and other pulses succeeding to the first pulse may be used instead of the first pulse. Further although the recognizing operation is controlled by the data control device in the embodiments, the scanning operation may be controlled by the data control device.

What I claim is:

1. A method for controlling information recognizing operation comprising the steps of:

transferring an object on a predetermined route at a constant speed, said object being recorded with information on the surface thereof;

generating a detection signal while said object passes through a predetermined position on said route;

scanning said information recorded on said object to thereby generate a data enabling signal per each object after the start of said detected signal;

generating a timer signal having a constant time period preset to be not longer than a period in which said object completes passing through said predetermined position, said timer signal being triggered by either one of said detection signal or said data enabling signal whereby said timer signal is generated per each object; and controlling information recognizing operation in response to said timer signal so that said information recorded on said object is recognized with said constant time period.

2. A method according to claim 1, wherein said timer signal is generated by a monostable multivibrator in response to said data enabling signal.

3. A method according to claim 1, wherein said timer signal is generated by a monostable multivibrator in response to said detection signal.

* * * * *